BAND COMPRESSION SYSTEM

Filed May 10, 1954

2 Sheets-Sheet 1

INVENTOR
C.B.H. FELDMAN
BY Harry C. Hart
ATTORNEY

Dec. 24, 1957 C. B. H. FELDMAN 2,817,711

BAND COMPRESSION SYSTEM

Filed May 10, 1954 2 Sheets-Sheet 2

INVENTOR
C.B.H. FELDMAN
BY Harry C. Hart
ATTORNEY

United States Patent Office 2,817,711

Patented Dec. 24, 1957

2,817,711

BAND COMPRESSION SYSTEM

Carl B. H. Feldman, Summit, N. J., assignor to Bell Telephone Laboratories, Incorporated, New York, N. Y., a corporation of New York Application May 10, 1954, Serial No. 428,779

10 Claims. (Cl. 179—15.55)

This invention relates to frequency band compression and particularly to the reduction of the frequency band required for the transmission of a telephone message without excessive degradation of its quality.

The frequency band customarily employed for the transmission of an unmodified voice current telephone message is at present standardized at the nominal figure of 4000 cycles per second; it commonly extends from about 200 cycles per second, as its lower limit, to an upper limit of about 3700 cycles per second. This represents a working compromise between the demands for a wide frequency band made by considerations of high fidelity of reproduction and the demands for a narrow frequency band made by considerations of economy in the allocation of channel space.

Many proposals have been made in the past for reducing this required frequency band by modifying the voice currents in various ways. Among such proposals a notable one is the channel vocoder of Dudley Patent 2,151,091 which is in principle capable of effecting a reduction of the order of ten to one or better. In this system, incoming voice currents are broken down into a number of sub-bands and a low frequency control signal is derived from each of these and transmitted to a receiver station. In particular, one of these control signals represents the fundamental or pitch frequency of the voice. At the receiver station the synthesizing apparatus includes a "buzz" source and a "hiss" source to represent the source of voiced sounds (the vocal cords) and the source of unvoiced or whispering sounds, respectively. The incoming control signals derived at the transmitter station operate to switch the buzz source and the hiss source into action in alternation as required and to adjust the frequency of the buzz source, i. e., to tune it. The energy of the buzz source, as the case may be, is applied to the synthesizing network which in turn is continuously adjusted by the control signals. Finally, its output is delivered to a reproducer.

The considerable economy of band width provided by this system is obtained by virtue of the facts that only the control signals are transmitted from the transmitter station to the receiver station, and that these control signals which vary only at syllabic rates, occupy very narrow bands. It is purchased, however, at the price of substantial complexity of apparatus and is therefore commercially feasible only in situations in which bandwidth economy is at a premium. Moreover, the derivation of the fundamental or pitch signal, which is essential to the proper operation of such apparatus, has in the past presented a serious engineering problem requiring apparatus of a high degree of complexity for its solution. This is especially so when, as often happens in the course of ordinary speech, there is little or no physical energy at the fundamental frequency, the "pitch" being a subjective phenomenon.

Another bandwidth reduction system which has been proposed, especially for emergency use, e. g. in Carter Patent 2,390,869, simply allots a band of 2000 cycles per second to each message, thus allocating two messages instead of one to each 4000 cycle channel. Of these, one lies naturally in the lower half of the 4000 cycle band while the other is shifted on the frequency scale by heterodyning techniques into the upper half of the channel. Thus a band-width reduction of two to one is secured. For the sake of this reduction, this system thus discards the high frequency voice components entirely. The price of this reduction is evidently a degradation of quality. However, because much of the information content of speech is carried by its lower frequencies, such degradation of quality does not result in excessive loss of intelligibility but mainly in a loss of naturalness.

Thus, in general, the transmission engineer is presented with a choice between two seemingly incompatible considerations: to effect a large bandwidth reduction, he must resort to excessive apparatus complication; but if such apparatus complexity is economically prohibitive, he must accept a bandwidth reduction of not more than two to one and a loss of naturalness at the same time.

It is the object of the present invention to resolve these seeming incompatibles and to effect an economical compromise between them. It permits a bandwidth reduction of nearly two to one with considerably less degradation, both of intelligibility and of naturalness, and without excessive apparatus complexity. It achieves its object and attains this result by direct and unmodified transmission of the low frequency components of the telephone message, pairing two such low frequency groups on a single standard 4000 cycle channel as in the Carter system. By contrast with the Carter system, it employs vocoder techniques to derive narrow band control signals from the high frequency components when present, transmits them to the receiver station and there employs them to control high frequency synthesizing circuits and to energize the latter from a local hiss source when required. By virtue of the direct unmodified transmission of the low frequency components of the voice, the present system avoids the greater part of the complexity of a vocoder system, and in particular the most difficult single vocoder problem, which is the derivation of the fundamental pitch control signal. The high frequency components, which are required only from time to time, are compressed by the vocoder treatment into narrow bands consistently with their relatively less importance from the standpoint of intelligibility.

In accordance with a further feature of the invention, apparatus of this character may conveniently be multiplexed by allocating a single additional 4000 cycle channel to carry the control signals representing the high frequency components of a considerable number of messages whose low frequency components are paired and allocated in pairs to each of a plurality of 4000 cycle voice channels.

The invention will be fully apprehended from the following detailed description of a preferred embodiment thereof taken in connection with the appended drawings in which.

Figures 1, 3:
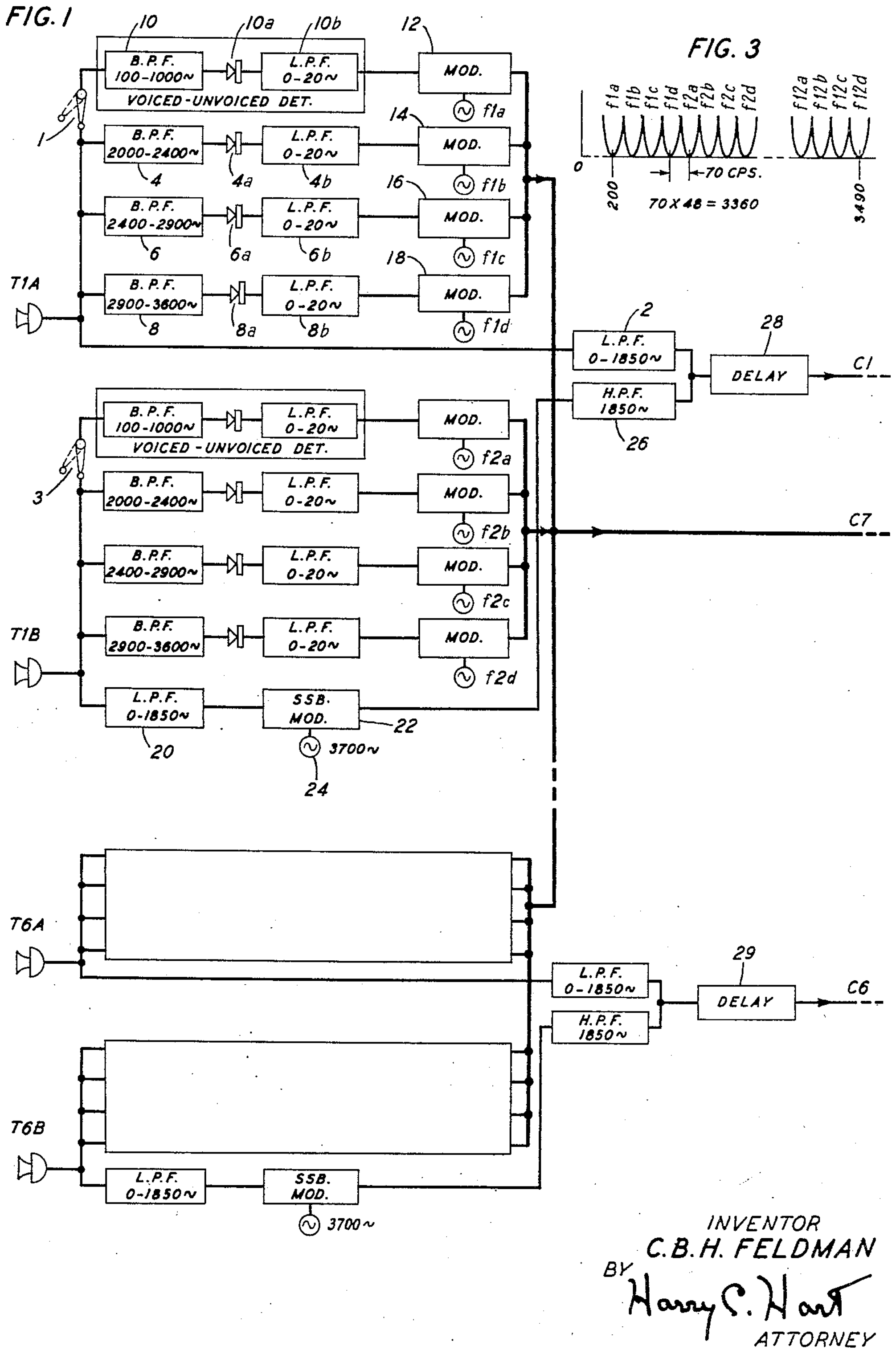
Fig. 1 is a block schematic diagram showing telephone transmitter apparatus illustrating the invention in two alternative forms.
Fig. 3 is a diagram illustrating the allocation on the frequency scale of sub-bands for carrying control signals in accordance with the invention.

Referring now to the drawings, Fig. 1 indicates six pairs of independent telephone transmitters, the first pair being labeled $T_1A$ and $T_1B$, respectively, while the sixth pair are labeled $T_6A$ and $T_6B$, and the second, third, fourth and fifth pairs are not shown. The associated apparatus for the first pair of transmitters is shown in detail in the drawing and may be identical for each of the other pairs. Referring in particular to the first pair, a telephone voice current originating in the transmitter $T_1A$ is applied to four paths in parallel and, by way of a switch 1 shown in its closed position, to a fifth path. In the first path a low pass filter 2, proportioned to pass energy in the range 0–1850 cycles per second, transmits the lower half of the voice current frequency range without modification. The voice currents are also applied to three band pass filters 4, 6, 8 in parallel whose pass bands, as indicated on the drawing, are 2000–2400 C. P. S., 2400–2900 C. P. S., and 2900–3600 C. P. S. To the output terminal of each of these band pass filters is connected a rectifier and a low pass filter (*4a*, *4b*, etc.) whose output therefore comprises a slowly varying control signal whose instantaneous magnitude represents the instantaneous magnitude of the energy in the frequency band with which it is associated. These three control signals are next systematically arranged adjacent to each other on the frequency scale by conventional heterodyning techniques, the apparatus for which comprises single sideband modulators 14, 16, 18 and oscillators $f_1b$, $f_1c$, $f_1d$. The modulators may be alike. The oscillators are adjusted to deliver oscillation frequencies which are successively higher in the frequency scale by a suitable frequency differential, e. g., 70 cycles per second.

Finally, the voice currents originating in the microphone $T_1A$ are applied to a voiced-unvoiced detector which may comprise, for example, the tandem combination of a band pass filter 10 whose pass band extends from approximately 100 C. P. S. to approximately 1000 C. P. S. followed by a rectifier 10*a*, as shown in Miller Patent 2,627,541. This combination is in turn followed by a low pass filter 10*b* whose cutoff is adjusted to about 20 cycles per second. The presence at the output terminal of this filter of a control signal of substantial amplitude indicates the presence of a voiced sound, while its absence indicates that the sound impinging on the microphone is an unvoiced sound. This control signal, like the others, is appropriately located on the frequency scale by a modulator 12 energized by an oscillator $f_1a$.

These four control signals, each occupying a band of perhaps 40 cycles per second, are transmitted by way of four sub-bands of a channel $C_7$, and are shown arranged side by side on the frequency scale in Fig. 3 where they are placed in the first four sub-bands of the figure, and spaced apart by 70 cycles per second, the mid-frequency of each band being identified by the same designation as its heterodyne oscillator.

At the same time, voice currents originating in the microphone $T_1B$ are similarly divided into a low frequency half, which passes through a low pass filter whose pass band extends to 1850 cycles per second, and a high frequency half. The low frequency voice components are shifted into the upper half of a standard 4000 cycle telephone channel by a single sideband modulator 22 energized by an oscillator 24 which delivers energy of a frequency of 3700 cycles per second. The modulator output is passed through a high pass filter 26 whose low frequency cutoff is adjusted to 1850 cycles per second to prevent low frequency crosstalk between the outputs of the two microphones.

Thus the low frequency components originating in the microphones $T_1A$ and $T_1B$, of which the former are unmodified while the latter are modified only by a shift on the frequency scale, lie side by side in a single standard telephone channel $C_1$ whereby they occupy its lower half band and its upper half band, respectively. A delay device 28 is interposed in this channel $C_1$ to equalize for the delays which are unavoidably introduced in the transmission of the higher frequency voice components originating in both of the microphones $T_1A$ and $T_1B$ by the vocoder apparatus.

The higher frequency components of the output of the microphone $T_1B$ are converted into four control signals, the first, which exists when the switch 3 is closed, indicating the presence or absence of a voiced sound, the second indicating the presence of energy in the range 2000–2400 cycles per second, the third indicating the presence of energy in the range 2400–2900 cycles per second, and the fourth indicating the presence of energy in the range 2900–3600 cycles per second. Each of these control signals is independently located on the frequency scale by modulators and oscillators. Thus, as indicated in Fig. 3, they may occupy the fifth, sixth, seventh and eighth of the sub-channels of the telephone channel $C_7$.

From the foregoing it will be understood that the outputs of the third and fourth microphones, not shown, which form a second pair, are similarly treated, their low frequency components forming a pair which occupy a second standard 4000 cycle telephone voice channel while their high frequency components, including a voiced sound control signal for each, occupy eight adjacent 70 cycle sub-bands. The same arrangement holds, furthermore, for the third, the fourth, the fifth and the sixth pair of microphones, only the sixth pair being shown. The low frequency components from this pair are treated as before and occupy the last channel $C_6$ of a group of six standard 4000 cycle telephone voice channels while the high frequency components occupy the last eight of a group of forty-eight 70-cycle sub-bands. The low frequency components are delayed as before to compensate for the delays introduced by the vocoder apparatus into the transmission of the higher frequency components.

The total of forty-eight 70-cycle sub-bands occupies a range of 3360 cycles per second which may extend on the frequency scale from a lower bound of 165 cycles per second to an upper bound of 3525 cycles per second for the highest. Thus the entire band of a seventh standard telephone channel has been allocated and, as shown on Fig. 1, an entire channel is allocated to the transmission of all the control signals originating in all twelve microphones, namely forty-eight control signals in all.

Figure 2:
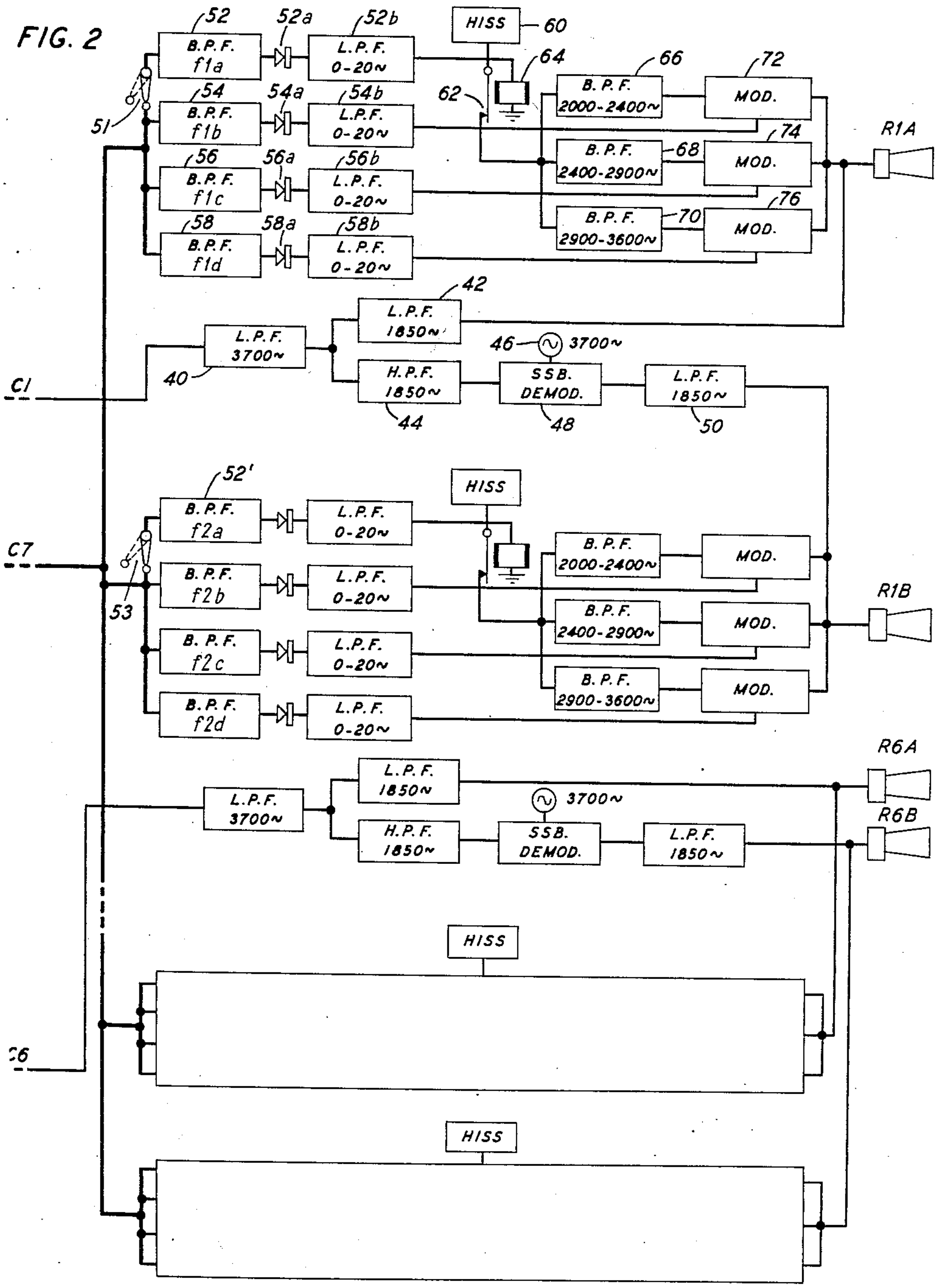
Fig. 2 is a block schematic diagram showing telephone receiver apparatus illustrating the invention in the same two alternative forms.

At the receiver station shown in Fig. 2, the energy arriving by way of the channel $C_1$ is applied first to a low pass filter 40 whose cutoff is adjusted, for example at 3700 cycles per second merely to exclude extraneous or spurious frequencies. It is then divided into a lower half and an upper half by a low pass filter 42 and a high pass filter 44. The lower half is delivered directly to a first reproducer labeled $R_1A$. The upper half is first shifted downward on the frequency scale to its original range by a 3700 cycle oscillator 46 and a single sideband demodulator 48. Modulation products are eliminated by a low pass filter 50 whose output is then delivered immediately to a second reproducer $R_1B$. Apparatus which may be identical with the foregoing is indicated for the channel $C_6$ which furnishes to the reproducers labeled $R_6A$ and $R_6B$ the low frequency components of the voice currents originating in the microphones $T_6A$ and $T_6B$, respectively. It will be understood that the energies appearing in channels $C_2$, $C_3$, $C_4$ and $C_5$, not shown, are to be similarly treated and delivered to reproducers $R_2A$, $R_2B$ . . . $R_5A$, $R_5B$, in order.

The energy appearing on the channel $C_7$, which carries the control currents originating in all twelve microphones $T_1A$ . . . $T_6B$ is applied in parallel to twelve groups of synthesizing apparatus, each such group being essentially similar to the others, the first group being shown in the upper part of Fig. 2, the second in the center, and the remaining groups merely indicated. The first group comprises a parallel arrangement of four band pass filters 52, 54, 56, 58, each of which passes a band of approximately 40 cycles width, the first being centered about the frequency $f_1a$, the second about the frequency $f_1b$, the third about the frequency $f_1c$, and the fourth about the frequency $f_1d$. The first of these filters passes energy when the switch 51 is closed, as shown. The outputs of the several filters are demodulated by rectifiers 52*a*, 54*a*, 56*a*, 58*a* and passed through low pass filters 52*b*, 54*b*, 56*b*, 58*b*, each of which has a cutoff at about 20 cycles per second. Thus, the output of the first of these filters constitutes the voiced-unvoiced control signal originating in the microphone $T_1A$ while the outputs of the second, third and fourth low pass filters represent the control signals for the first, second and third voice current sub-bands originating at the same microphone.

The synthesizing apparatus by which high frequency components of the voice currents are artificially produced comprises a hiss source 60 whose energy is delivered, when required, by way of the back contacts 62 of a relay 64, to three band pass filters 66, 68, 70 in parallel. The pass bands of these filters are proportioned to be identical with the pass bands of the three corresponding filters 4, 6, 8 at the transmitter station. The control signals derived from the low pass filters 66, 68, 70 are applied to the control terminals of three modulators 72, 74, 76 which operate to adjust the amplitudes of the ouputs of the band pass filters in the fashion described in Dudley Patent 2,151,091. In consequence, the outputs of these modulators, except for a time delay which is necessitated by the fact that apparatus of this character cannot operate instantaneously, are identical with the inputs to the band pass filters at the transmitter station. This delay has already been described as equalized in anticipation by the device 28. Hence these outputs may be combined additively and applied, along with the low frequency components from the low pass filter 42, to the reproducer $R_1A$. They exist in significant amounts when two conditions coincide, namely (*a*) the modulators 72, 74, 76 are adjusted by the control signals to substantial amplitudes, and (*b*) the energy of the hiss source 60 is applied to them by way of the back contacts of the relay 64 which remains unenergized until the voiced-sound control signal passing through the filter 52 rises above a preassigned level.

The construction and operation of the high frequency synthesizing apparatus shown in the center part of the figure is essentially the same, provided the switch 53 be closed, the only difference being that the control signals which pass the first group of filters are those of the fifth, sixth, seventh and eighth 70 cycle sub-bands of Fig. 3; i. e., they are those derived from the high frequency voice components originating in the microphone $T_1B$. These control currents operate in the foregoing fashion to control the artificial synthesis of the corresponding high frequency voice components and to deliver them, along with the low frequency components lying in the upper half of the band of the channel $C_1$, to the reproducer $R_1B$.

From the foregoing, it will be understood that the high frequency control signals derived by the transmitter apparatus from the microphones $T_2A$ through $T_6B$, inclusive, are similarly employed to control the artificial synthesis of corresponding high frequency speech components and to assign them, along with the appropriately selected low frequency components from channels $C_2$ through $C_6$, inclusive, to the reproducers $R_2A$ through $R_6B$, inclusive. The hiss source 60 may be common to all the high frequency channels.

The apparatus by which the foregoing operations are carried out is susceptible of a further simplification which carries with it an additional, though small, saving in bandwidth at the price of permitting the output energy of the hiss source 60 to be applied continuously to the receiver filters 66, 68, 70. Adjustment for operation in this fashion is illustrated merely by opening the switches 1, 3 in series with the voiced-unvoiced detectors 10, 10*a*, 10*b* at the transmitter station and the switches 51, 53 in series with the corresponding control signal band pass filters 52, 52' at the receiver station. This disables these paths and ensures that the relay 64 be not energized. The electrical connection through the back contacts 62 of the relay 64 then remains established continuously, and the hiss source 60 is thus continuously applied to the high frequency band pass filters 66, 68, 70 in parallel. If it be preferred to employ the apparatus in this fashion, it is obvious that the unused paths, both at transmitter and receiver, extending from the voiced-unvoiced detector 10, 10*a*, 10*b* to the relay 64 and including all apparatus components in tandem with these elements may be dispensed with.

Continuous application of the hiss source 60 does not mean continuous hissing sounds in the artificially reproduced voices. On the contrary, when the control signals are of magnitudes such as to call for high attenuation of the artificially reproduced high frequency components by the modulators 72, 74, 76, the resulting reproduced sound consists only of the directly transmitted low frequency voiced sounds. When, on the other hand, high frequency components of substantial amplitude exist in the voiced sound, the corresponding control currents are likewise of substantial amplitude, thus admitting substantial energy of the hiss source 60 to the reproducer $R_1A$. While the effect on the naturalness of the artificially reproduced voice under these conditions has not been entirely determined, it appears from presently available data that it may actually constitute an improvement, at least under some circumstances.

The foregoing illustrative embodiments of the invention have been shown for twelve simultaneous one-way telephone conversations. It will be evident to those skilled in the art that standard practices and techniques may be employed in the practical case of a number of two-way conversations for effecting further apparatus economies. Thus, for example, by the employment of hybrid coils, a single 3700 cycle oscillator located at an east station may serve both to energize a modulator for an outgoing conversation and a demodulator for an incoming conversation, the same being equally true at a west station. Other particulars in which standard telephone techniques may be employed further to reduce the complexity of the apparatus will suggest themselves to those skilled in the art.

What is claimed is:

1. Apparatus for transmitting a voice signal from point to point which comprises means for transmitting low frequency components of said voice signal without modification, means for compressing the bandwidth of high frequency components, and means for transmitting said high frequency components as compressed.

2. Apparatus for transmitting a voice signal from point to point which comprises means for transmitting low frequency components of said voice signal without modification, means for compressing the bandwidth of high frequency components, means for transmitting said high frequency components as compressed to a receiver station and, at said receiver station means for expanding the bandwidth of said high frequency components, means for mixing said expanded high frequency components with said transmitted low frequency components, and means for reproducing the resulting mixture.

3. Apparatus as defined in claim 1 wherein coding means are employed to reduce the bandwidth of the high frequency components.

4. Apparatus as defined in claim 2 wherein decoding means are employed to expand the bandwidth of said high frequency components.

5. The method of transmitting a voice signal which comprises transmitting low frequency components of said voice signal without modification, compressing the bandwidth of high frequency components, transmitting said high frequency components as compressed to a receiver station and, at said receiver station, expanding the bandwidth of said high frequency components, mixing said expanded high frequency components with said transmitted low frequency components, and reproducing the resulting mixture.

6. Apparatus for transmitting a telephone voice signal which occupies a preassigned frequency range which comprises means for dividing said frequency range into a lower half range and an upper half range, means for transmitting natural voice component currents in said lower half range directly and continuously to a receiver station, means for deriving control signals representative of voice component currents in said upper half range, means for transmitting said control signals to said receiver station and, at said receiver station, means for utilizing said control signals to control the synthesis of artificial upper half range voice component currents, means for combining said artificially synthesized upper half range component currents with said directly transmitted natural lower half range component currents, and means for reproducing said combined currents as a voice sound.

7. Apparatus for transmitting a first number 2N of telephone messages over a lesser number $N+1$ of telephone channels which comprises means for dividing the frequency range of each of said 2N messages into a low frequency part and a high frequency part, means for grouping said 2N low frequency part messages in N pairs, means for continuously and directly transmitting said N part message pairs over N of said channels, means for individually coding each of said 2N high frequency part messages into a second number $n$ of control signals each of which $2+N$ control signals occupies a narrow band whose extent on the frequency scale is substantially equal to $$\frac{B}{2nN}$$

wherein B is the bandwidth of one of said channels, means for grouping all of said control signals, means for transmitting said grouped control signals over an $(N+1)$th channel to a receiver station, and, at said receiver station, means for receiving said 2N low frequency part messages, means for segregating from said $(N+1)$th channel said control signals in groups of $n$, means for utilizing each group of $n$ segregated control signals for the artificial synthesis of a high frequency part message, and means for combining each such high frequency part message with an appropriately selected one of said 2N low frequency part messages as received.

8. Apparatus as defined in claim 7 wherein the dividing means effects a division of each low frequency part message into two substantially equal parts, each of which occupies one half the bandwidth of a channel.

9. In combination with apparatus as defined in claim 8, means for shifting one member of each pair of message parts upward on the frequency scale by substantially its own bandwidth.

10. Apparatus as defined in claim 9 wherein each shifting means comprises a single sideband modulator.

References Cited in the file of this patent

UNITED STATES PATENTS

| | | |
|---|---|---|
| 2,458,227 | Vermuelen et al. | Jan. 4, 1949 |
| 2,466,880 | Dudley | Apr. 12, 1949 |
| 2,635,146 | Steinberg | Apr. 14, 1953 |